United States Patent
Hinton et al.

(10) Patent No.: US 8,844,053 B2
(45) Date of Patent: *Sep. 23, 2014

(54) METHOD AND SYSTEM FOR CREATING A PROTECTED OBJECT NAMESPACE FOR A WSDL RESOURCE DESCRIPTION

(71) Applicant: International Business Machines Corporation, Armonk, NY (US)

(72) Inventors: Heather M. Hinton, Austin, TX (US); Anthony S. Moran, Santa Cruz, CA (US); Patrick R. Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,867

(22) Filed: Jun. 10, 2013

(65) Prior Publication Data

US 2013/0276137 A1    Oct. 17, 2013

Related U.S. Application Data

(63) Continuation of application No. 11/123,317, filed on May 6, 2005, now Pat. No. 8,464,317.

(51) Int. Cl.
*G06F 21/62*    (2013.01)

(52) U.S. Cl.
USPC .............. 726/27; 726/4; 707/999.002

(58) Field of Classification Search
USPC .............. 726/27, 4; 707/999.002, 2
See application file for complete search history.

(56) References Cited

U.S. PATENT DOCUMENTS

| | | | |
|---|---|---|---|
| 7,404,189 B2 * | 7/2008 | Benedetti | 719/317 |
| 7,702,746 B2 * | 4/2010 | Conner et al. | 709/217 |
| 8,234,387 B2 * | 7/2012 | Bradley et al. | 709/229 |
| 8,554,876 B2 * | 10/2013 | Winsor | 709/219 |
| 8,600,783 B2 * | 12/2013 | Smith et al. | 705/5 |

* cited by examiner

*Primary Examiner* — Amare F Tabor
(74) *Attorney, Agent, or Firm* — Jeffrey S. LaBaw; David H. Judson

(57) ABSTRACT

A method and system is presented to parse a WSDL description and build a hierarchical protected object namespace for authorization of access to the resource, wherein the protected object namespace is based on the abstract part of a WSDL but can be used to assist in authorization decisions for multiple different concrete bindings of this WSDL, wherein the concrete binding/request is based on the WS-Addressing endpoint reference.

16 Claims, 8 Drawing Sheets

```
<wsdl:portType name="WeatherForecast_SEI">
    <wsdl:operation name="getTodayForecast" parameterOrder="startDate">
        <wsdl:input message="intf:getTodayForecastRequest" name="getTodayForecastRequest"/>
        <wsdl:output message="intf:getTodayForecastResponse" name="getTodayForecastResponse"/>
    </wsdl:operation>
    <wsdl:operation name="getWeekForecast" parameterOrder="startDate">
        <wsdl:input message="intf:getWeekForecastRequest" name="getWeekForecastRequest"/>
        <wsdl:output message="intf:getWeekForecastResponse" name="getWeekForecastResponse"/>
    </wsdl:operation>
    <wsdl:operation name="getDayForecast" parameterOrder="theDate">
        <wsdl:input message="intf:getDayForecastRequest" name="getDayForecastRequest"/>
        <wsdl:output message="intf:getDayForecastResponse" name="getDayForecastResponse"/>
    </wsdl:operation>
</wsdl:portType>
```

*FIG. 10*

METHOD AND SYSTEM FOR CREATING A PROTECTED OBJECT NAMESPACE FOR A WSDL RESOURCE DESCRIPTION

BACKGROUND OF THE INVENTION

1. Field of the Invention

The present invention relates to an improved data processing system and, in particular, to a method and apparatus for multicomputer data transferring. Still more particularly, the present invention provides a method and apparatus for performing authorization decisions for controlling access to computational resources.

2. Description of Related Art

A relatively new type of application, called a web service application, has been implemented by service providers within the World Wide Web. Specification documents for standardizing programmatic interfaces between web service applications have been promulgated by various organizations and institutions. For example, W3C®, or the World Wide Web Consortium, has drafted specifications for a Web Services Description Language (WSDL), which is an XML-based (eXtensible Markup Language) language for describing web services. According to W3C®, WSDL is an XML format for describing network services as a set of endpoints that operate on messages that contain either document-oriented or procedure-oriented information. A WSDL description of a service contains two parts: an abstract part and a concrete part. The abstract WSDL description of a resource describes the resource in the most generic terms. The concrete WSDL description provides a binding of this abstract WSDL to a particular message format and network protocol. For example, it is in the concrete WSDL description that a binding to SOAP/HTTP is made. A given abstract WSDL description can be bound to multiple formats, such as SOAP/HTTP, SOAP/JMS, and even RMI/IIOP. The operations and messages are described abstractly and then bound to a concrete network protocol and message format to define an endpoint. Related concrete endpoints are combined into services. WSDL is extensible to allow description of endpoints and their messages regardless of what message formats or network protocols are used to communicate.

A typical enterprise's data processing system contains robust support for security-related operations. Within a data processing system, enterprises often use support servers to provide authorization, authentication, and session management services as a front-end to application servers. It would be advantageous to have a method and a system within a computing environment to extend access management of computational resources to include web services as defined within WSDL documents.

SUMMARY OF THE INVENTION

A method and system is presented to parse a WSDL description and build a hierarchical protected object namespace for authorization of access to the resource, wherein the protected object namespace is based on the abstract part of a WSDL but can be used to assist in authorization decisions for multiple different concrete bindings of this WSDL, wherein the concrete binding/request is based on the WS-Addressing endpoint reference.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 9-12 depict a more detailed example of the manner in which the present invention builds a protected object namespace based on a WSDL that describes the addressing of a resource.

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
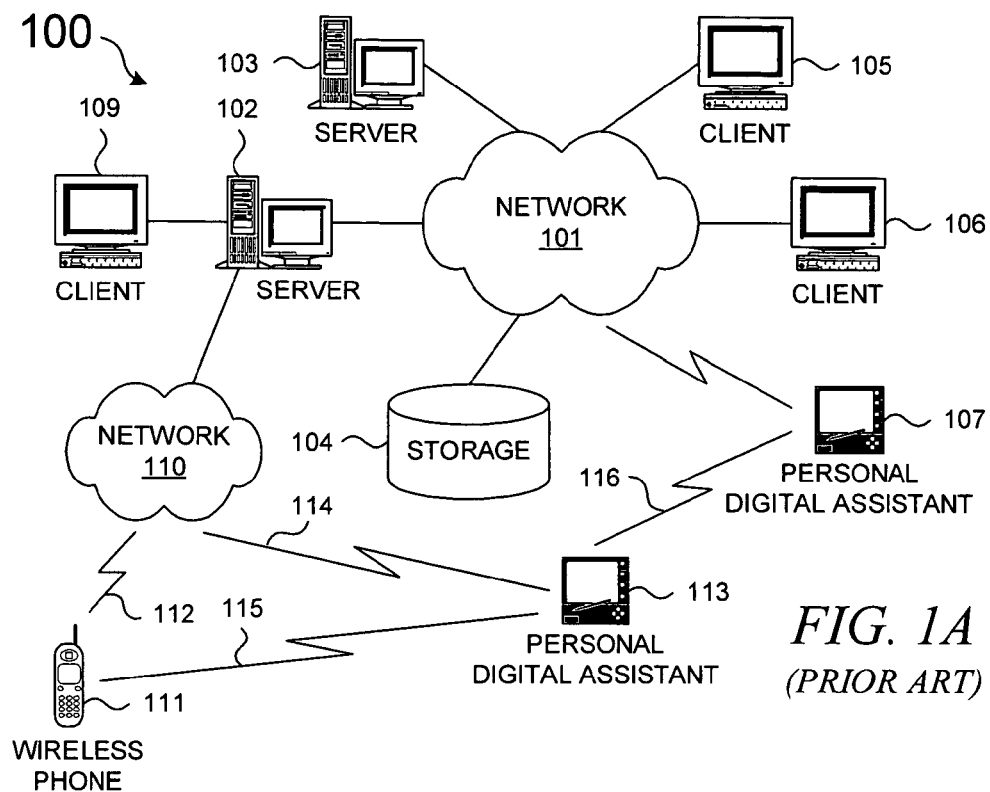
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), Simple Object Access Protocol (SOAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
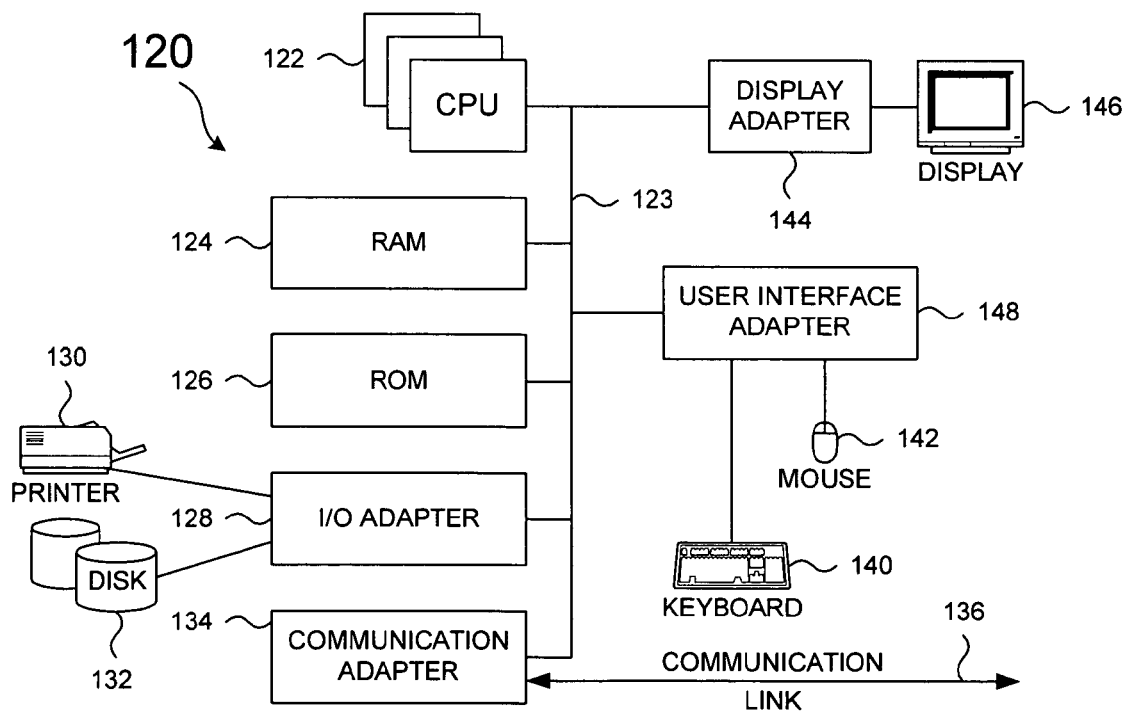
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved distributed data processing environment. Prior to describing the present invention in more detail, some aspects of typical distributed data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Certain computational tasks may be described hereinbelow as being performed by functional units. A functional unit may be represented by a routine, a subroutine, a process, a sub-process, a procedure, a function, a method, an object-oriented object, a software module, an applet, a plug-in, an ActiveX™ control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that an exchange of information between computational components, which may include a synchronous or asynchronous request/response exchange, may be implemented equivalently via a variety of data exchange mechanisms, such as messages, method calls, remote procedure calls, event signaling, or other mechanism.

Figure 1C:
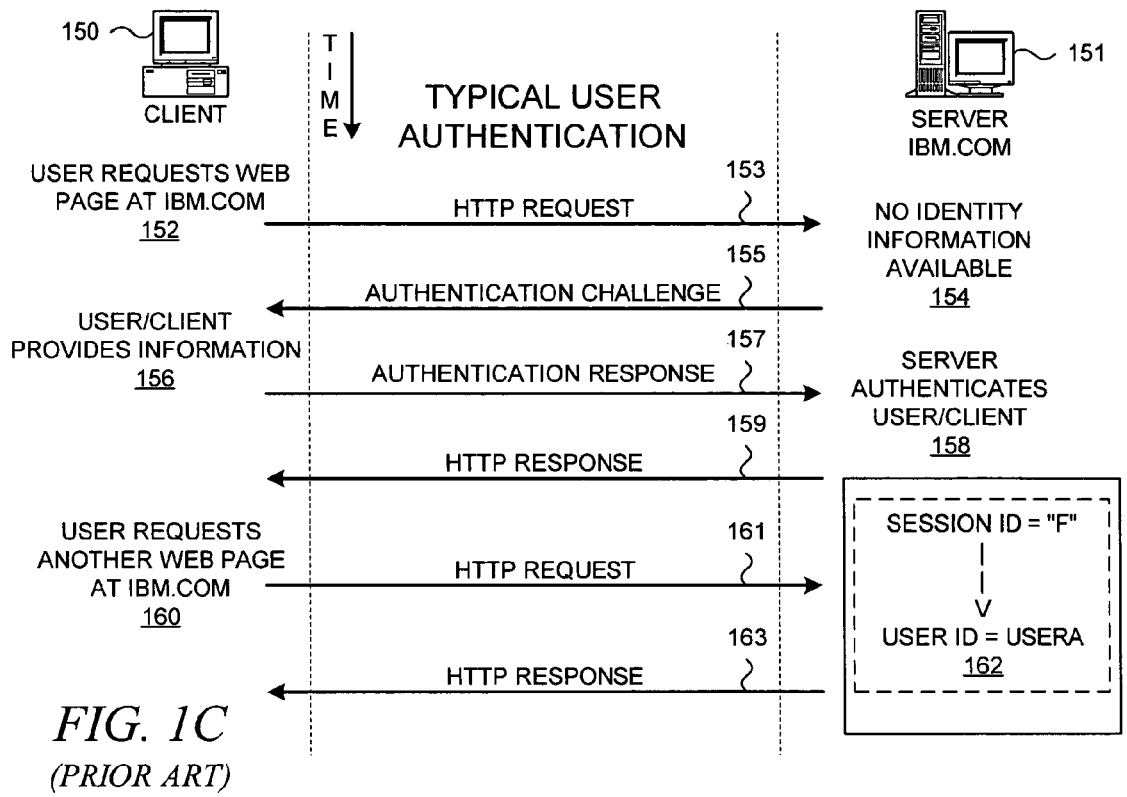
FIG. 1C depicts a dataflow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected resource is a computational resource (an application, an object, a document, a page, a file, executable code, or other computational resource, communication-type resource, etc.) for which access is controlled or restricted. A protected resource may be identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request that is sent to the web server that is hosting the domain "ibm.com" (step 153). The terms "request" and "response" should be understood to comprise data formatting that is appropriate for the transfer of information that is involved in a particular operation, such as messages, communication protocol information, or other associated information.

The server determines that it does not have an active session for the client (step 154), so the server requires the user to perform an authentication process by sending the client some type of authentication challenge (step 155). The authentication challenge may be in various formats, such as an HTML form. The user then provides the requested or required information (step 156), such as a user identifier and an associated password, or the client may automatically return certain information, such as a digital certificate.

The authentication response information is sent to the server (step 157), at which point the server authenticates the user or client (step 158), e.g., by retrieving previously submitted registration information and matching the presented authentication information with the user's stored information. Assuming the authentication is successful, an active session is established for the authenticated user or client.

The server then retrieves the requested web page and sends an HTTP response message to the client (step 159). At that point, the user may request another page within "ibm.com" (step 160) within the browser by clicking a hypertext link, and the browser sends another HTTP request message to the server (step 161). At that point, the server recognizes that the user has an active session based on session state information that is maintained by the server (step 162). For example, the server recognizes the appropriate session state information for the requesting user because the user's client returns a session ID within the HTTP Request message. Based on the cached user session information, the server determines that the user has already been authenticated, e.g., by the availability of a copy of the user's credentials; the server can then determine that certain operations, such as an authentication operation, is not required to be performed prior to fulfilling the user's request. The server sends the requested web page back to the client in another HTTP response message (step 163), thereby fulfilling the user's original request for the protected resource.

Figure 2:
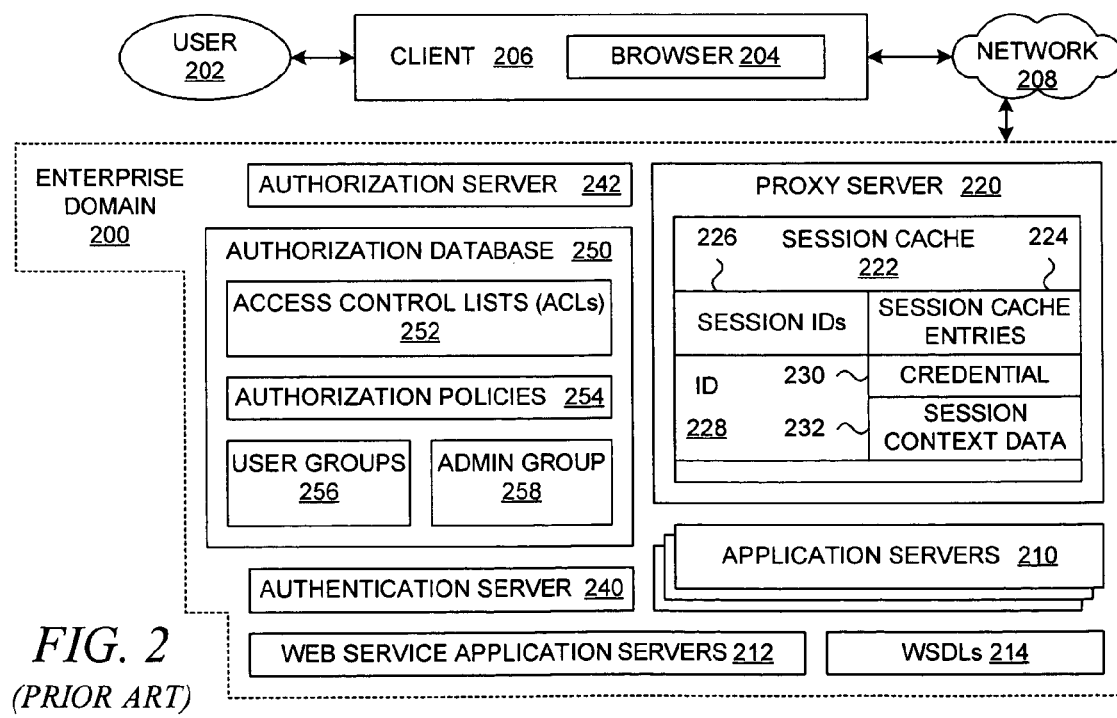
FIG. 2 depicts a block diagram that shows a typical enterprise data processing system.

With reference now to FIG. 2, a block diagram depicts a typical enterprise data processing system. Whereas FIG. 1C depicts a typical authentication process that may be used when a client attempts to access a protected resource at a server, in contrast, FIG. 2 shows some of the server-side entities that may be used to support the authentication process that is shown in FIG. 1C and to support subsequent client requests.

As in a typical corporate computing environment or an Internet-based computing environment, enterprise domain 200 hosts controlled resources that user 202 can access, e.g., by using browser application 204 on client 206 through network 208; the computer network may be the Internet, an intranet, or other network, as shown in FIG. 1A or FIG. 1B. A protected or controlled resource is a resource (an application, an object, a document, a page, a file, executable code, or other computational resource, communication-type resource, etc.) that is only accessed or retrieved if the requesting client or requesting user is authenticated and authorized; in some cases, an authenticated user is, by default, an authorized user.

Enterprise domain 200 supports multiple servers. Application servers 210 support controlled and/or uncontrolled resources through web-based applications or other types of back-end applications, including legacy applications. Web service application servers 212 provide support for web services that are described in WSDL (Web Service Description Language) documents 214. Reverse proxy server 220, or more simply, proxy server 220, performs a wide range of functions for enterprise domain 200, e.g., caching web pages in order to mirror the content from an application server or filtering the incoming and outgoing datastreams in order to perform various processing tasks on incoming requests and outgoing responses; each check may be performed in accordance with goals and conditions that are specified within various enterprise policies. Although FIG. 2 depicts proxy server 220 as containing functionality for supporting session management operations, similar session management operations could be performed elsewhere within enterprise domain 200.

The above-noted entities within enterprise domain 200 represent typical entities within many computing environments. As was shown with respect to FIG. 1C, web-based applications typically utilize various means to prompt users to enter authentication information, often as a username/password combination within an HTML form. In the example that is shown in FIG. 2, user 202 may be required to be authenticated before client 206 may have access to resources, after which a session is established for client 206 in a manner similar to that described above in FIG. 1C. In an alternative embodiment, authentication and authorization operations are not performed prior to providing a user with access to resources on domain 200; a user session is created without an accompanying authentication operation.

After receiving an incoming request from client 206, one of the processing tasks of proxy server 220 may be to determine whether client 206 has already established a session. Proxy server 220 maintains session cache 222; for each session that is activated, proxy server 220 associates a session identifier with any information that is required to maintain the state of the session. In the example shown in FIG. 2A, session cache 222 is organized as a simple two-dimensional table containing session cache entries 224 that are searchable by session identifiers 226. For example, session ID 228 is associated with a session cache entry that contains a copy of user credential 230 and/or other session context data 232, such as flags for indicating various session state information; user credential 230 may be retrieved or obtained from an authentication server.

If client 206 has not already established a session, e.g., which may be determined by a failure to recognize or verify a session ID from client 206 and/or which would be indicated by a lack of a session cache entry for client 206, an authentication service on authentication server 240 can be invoked in order to authenticate user 202. Authentication server 240 may support various authentication mechanisms, such as username/password, X.509 certificates, or secure tokens; multiple authentication servers could be dedicated to specialized authentication methods. If user 202 is successfully authenticated, then a session is activated for client 206, and a session cache entry is created. The authentication service returns a credential to be used in conjunction with any subsequent processing that is performed on behalf of client 206 within enterprise domain 200; the credential may be copied to the session cache entry that is associated with client 206.

If client 206 has already established a session, then additional authorization checks may be performed by proxy server 220 on an incoming request prior to granting access to a controlled resource. Before initiating an authorization operation, proxy server 220 locates the session cache entry that is associated with client 206, obtains the credential from the session cache entry, i.e. the credential that was previously associated with client 206 when user 202 was authenticated, and passes the credential and any other appropriate information to authorization server 242.

Proxy server 220 is able to locate the appropriate credential for the incoming request because of a previous series of actions. Within a typical web server environment, session identifiers for user sessions can be echoed from a user's browser application through a variety of mechanisms, e.g., URL rewriting, HTTP cookies, or some other mechanism. For session identifier management using URL rewriting, when a previous web page was returned to client 206, the URLs within the web page, e.g., those that were associated with hyperlinks to controlled resources, would have been rewritten to append the appropriate session identifier to each hyperlink. When user 202 selected a hyperlink within that web page, browser 204 generated a request to enterprise domain 200 for the web page or other resource that is identified by the URL that is associated with the selected hyperlink. Proxy server 220 parses the URL in the incoming request to retrieve the associated session identifier. For session identifier management using HTTP cookies, an HTTP Response message contains a special "SET-COOKIE" header that has at least one name-value pair, wherein the value of the cookie comprises a session identifier in some manner. When the user's browser application recognizes the "SET-COOKIE" header in the HTTP Response message, the browser sets a cookie in its cookie cache, wherein the cookie is associatively stored with the domain name of the sending domain. When the browser subsequently sends an HTTP Request message to that domain, the browser includes the appropriate cookie in the HTTP Request message. When the cookie contains a session ID, then the session ID is returned to the domain, which may then employ the session ID to recognize the appropriate session state information to be associated with the incoming request. In this manner, a web application server returns a cookie with the session ID with each response to the user's client, and the user's client echoes any appropriate cookie or cookies when sending a subsequent request to a web application server.

Authorization server 242 may employ authorization database 250, which contains information such as access control lists 252, authorization policies 254, information about user groups or roles 256, and information about administrative users within a special administrative group 258. Using this information, authorization server 242 provides indications to proxy server 220 whether a specific request should be allowed to proceed, e.g., whether access to a controlled resource should be granted in response to a request from client 206. It should be noted that the present invention may be implemented in association with a variety of authentication and authorization applications, and the embodiments of the present invention that are depicted herein should not be interpreted as limiting the scope of the present invention with respect to a configuration of authentication and authorization services.

Figure 3:
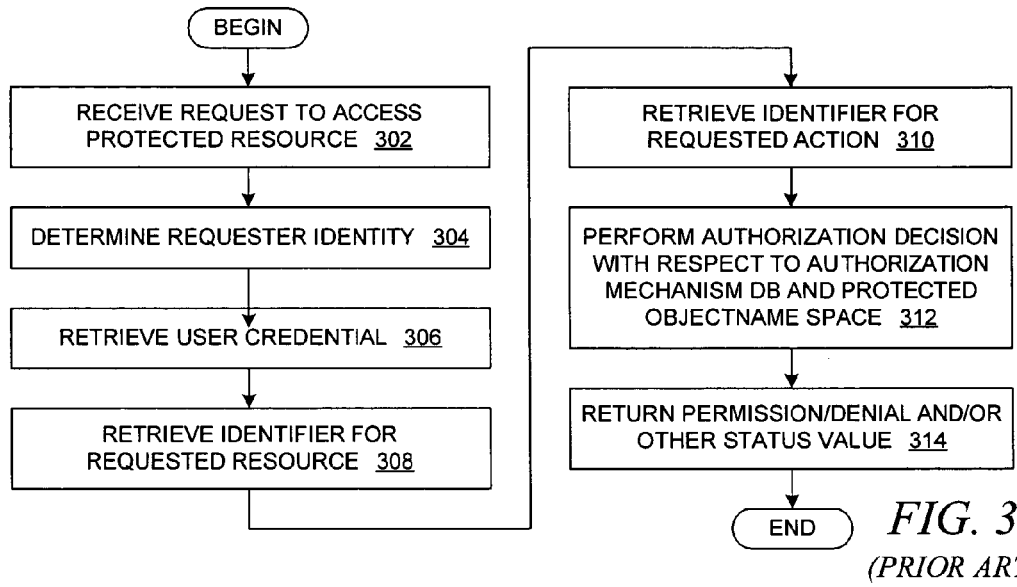
FIG. 3 depicts a flowchart that shows a typical process for performing an authorization operation with respect to a request to access a protected resource.

With reference now to FIG. 3, a flowchart depicts a typical process for performing an authorization operation with respect to a request to access a protected resource. The process commences when a request to access a protected resource is received (step 302), e.g., formatted as a request message. The identity of the requesting user/client is determined (step 304), e.g., via an association of the request with session management information, and the proper user/client credential for the requesting identity is retrieved (step 306). An identifier of the requested resource is retrieved (step 308), e.g., from the resource request along with an identifier of the requested action (step 310). The authorization decision is then performed (step 312) with reference to a protected object namespace and an authorization mechanism database. The resulting permission or denial and/or other status/result value that represents the authorization decision is then returned (step 314), and the process is concluded.

Figure 4:
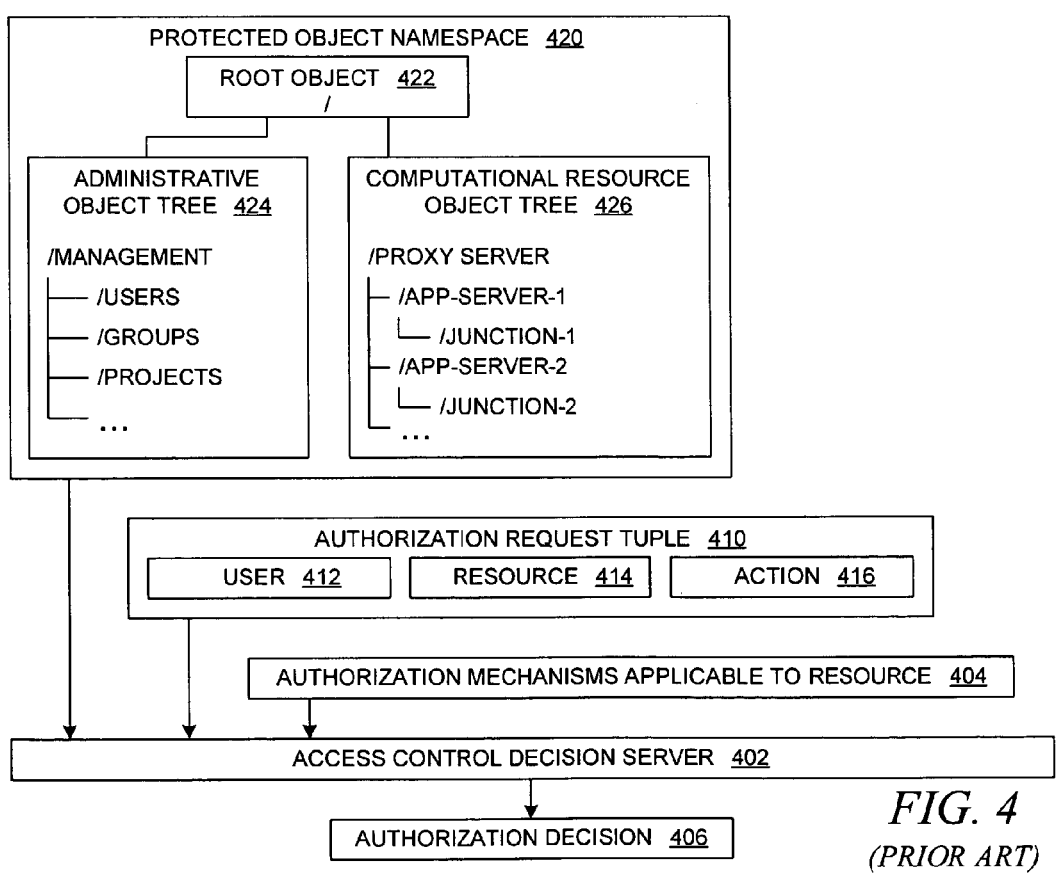
FIG. 4 depicts a block diagram that shows a typical set of inputs and output to an access control decision server during an authorization decision.

With reference now to FIG. 4, a block diagram depicts a typical set of inputs and outputs to an access control decision server during an authorization decision, such as the decision process that is shown in FIG. 3. Access control decision server 402 represents a type of authorization server as shown in FIG. 2. Access control decision server 402 applies authorization policies, access control lists, authorization rules, and/or other types of authorization mechanisms 404 to resource requests in order to make authorization decision 406; authorization decision 406 is sent, forwarded, returned, or otherwise transmitted to whichever entity relies upon authorization decision 406 for determining whether or not the entity should provide access to a protected resource. Access control decision server 402 considers authorization request tuple 410, which represents a request to access a resource after a received resource request has received some localized processing. In this example, authorization request tuple 410 includes user 412, resource 414, and action 416. User 412 represents an entity that has a valid credential, which is often a natural person but could be any entity, including a group of natural persons, a programmatic entity, a physical device, etc.; hence, user 412 represents any entity whose access to protected resources is controlled in some manner. User 412 may be represented a user credential, possibly after an optional mapping to a local identity. Resource 414 represents any resource that is controlled within an enterprise domain; resource 414 is preferably formatted as some type of resource identifier, e.g., a Uniform Resource Identifier (URI). Action 416 represents a type of access requested by user 412 for resource 414; in other words, action 416 represents a particular type of use of resource 414.

An authorization mechanism database, e.g., containing information such as that shown in authorization database 250 in FIG. 2, informs the access management server about the authorization mechanisms that are applicable to the objects within protected object namespace 420. Each resource or group of resources is represented as a named object within protected object namespace 420; hence, resource 414 refers to a resource that is represented within protected object namespace 420. Resources are organized hierarchically into various subtrees based on the type of resource; in the example that is shown in FIG. 4, protected object namespace 420 contains root object 422, administrative object tree 424, and computational resource object tree 426. Root object 422 acts as a placemarker for the root of protected object namespace 420. Administrative object tree 424 contains objects that represent entities that are administratively defined, such as users, groups, projects, etc. Computational resource object tree 426 contains objects that represent hardware devices or various types of functional units. Other subtrees could be included within protected object namespace 420, e.g., operating system resources.

As mentioned above, specification documents for standardizing programmatic interfaces between web service applications have been promulgated by various organizations and institutions. For example, W3C®, or the World Wide Web Consortium, has drafted specifications for a Web Services Description Language (WSDL), which is an XML-based (eXtensible Markup Language) language for describing web services. According to W3C®, WSDL is an XML format for describing network services as a set of endpoints that operate on messages that contain either document-oriented or procedure-oriented information. A WSDL description of a service contains two parts: an abstract part and a concrete part. The abstract WSDL description of a resource describes the resource in the most generic terms. The concrete WSDL description provides a binding of this abstract WSDL to a particular message format and network protocol. For example, it is in the concrete WSDL description that a binding to SOAP/HTTP is made. A given abstract WSDL description can be bound to multiple formats, such as SOAP/HTTP, SOAP/JMS, and even RMI/IIOP. The operations and messages are described abstractly and then bound to a concrete network protocol and message format to define an endpoint. The operations and messages are described abstractly and then bound to a concrete network protocol and message format to define an endpoint. Related concrete endpoints are combined into abstract endpoints (services). WSDL is extensible to allow description of endpoints and their messages regardless of what message formats or network protocols are used to communicate.

W3C® has also drafted specifications for Web Services Addressing, called WS-Addressing, which provides transport-neutral mechanisms to address Web services and messages. Specifically, this specification defines XML elements to identify Web service endpoints and to secure end-to-end endpoint identification in messages. This specification enables messaging systems to support message transmission through networks that include processing nodes such as endpoint managers, firewalls, and gateways in a transport-neutral manner. WS-Addressing-defined endpoint references are based on the concrete binding.

In other words, web services allow resources to be described within a WSDL document, wherein the resource itself is described by several different levels of granularity: Address, Service Name, Port Type, Operation Name. WS-Addressing describes how to reference or locate a web services resource, referred to as an endpoint reference (EPR). The "wsa:EndpointReferenceType" datatype is used wherever a Web service endpoint is referenced; an example of the contents of an abstract endpoint reference is:

```
<wsa:EndpointReference>
    <wsa:Address> ... </wsa:Address>
    <wsa:ReferenceProperties> ... </wsa:ReferenceProperties> ?
    <wsa:ReferenceParameters> ... </wsa:ReferenceParameters> ?
    <wsa:PortType> ... </wsa:PortType> ?
    <wsa:ServiceName> ... </wsa:ServiceName> ?
    <wsp:Policy> ... </wsp:Policy>*
</wsa:EndpointReference>
```

The "<wsa:PortType>" and "<wsa:ServiceName>" elements correspond to elements that are extracted from a WSDL document, whereas "ReferenceProperties" and "ReferenceParameters" are specific to WS-Addressing, and "Policy" is a WS-Policy-defined additional element that may be used for guidance on how to do access control above and beyond what is done locally or instructions on requirements to access a resource.

The Web Services Policy Framework (WS-Policy) specification provides a general purpose model and corresponding syntax to describe and communicate the policies of a Web service. WS-Policy defines a base set of constructs that can be used and extended by other Web services specifications to describe a broad range of service requirements, preferences, and capabilities. WS-Policy provides a flexible and extensible grammar for expressing the capabilities, requirements, and general characteristics of entities in an XML Web-services-based system. In addition, WS-Policy defines a framework and a model for the expression of these properties as policies. Policy expressions allow for both simple declarative assertions as well as more sophisticated conditional assertions.

WS-Policy defines a policy to be a collection of one or more policy assertions. Some assertions specify traditional requirements and capabilities that are presented within a data processing system, e.g., authentication scheme, transport protocol selection. Some assertions specify requirements and capabilities that have no manifestation yet are critical to proper service selection and usage, e.g., privacy policy, or quality-of-service characteristics. WS-Policy provides a single policy grammar to allow both kinds of assertions to be reasoned about in a consistent manner.

The WS-Policy specification defines an abstract model and an XML-based expression grammar for policies. However, WS-Policy does not specify how policies are discovered or attached to a Web service. Other specifications are free to define technology-specific mechanisms for associating policy with various entities and resources. The Web Services Policy Attachment (WS-PolicyAttachment) specification defines two general-purpose mechanisms for associating such policies with the subjects to which they apply. This specification also defines how these general-purpose mechanisms can be used to associate WS-Policy with WSDL and UDDI descriptions.

Information can be included in an endpoint reference element as part of a request for security-related token processing, where it is used to determine the appropriate token type based on the endpoint reference to which the request applies. For example, the structure of an "<AppliesTo>" endpoint reference can be described in the following manner.

/PolicyAttachment/AppliesTo/EndpointReference
  This element is used to reference (apply to) a deployednd-point.
/PolicyAttachment/AppliesTo/EndpointReference/Address
  This required element specifies the address for the target endpoint.
/PolicyAttachment/AppliesTo/EndpointReference/Address/@URI
  This required attribute specifies the URI address of the service.
/PolicyAttachment/AppliesTo/EndpointReference/PortType
  This optional element specifies the type affiliation of the port being referenced.
/PolicyAttachment/AppliesTo/EndpointReference/PortType/@Name
  This required attribute specifies the QName of the port.
/PolicyAttachment/AppliesTo/EndpointReference/ServiceName
  This optional element specifies the wsdl:service definition being referenced.
/PolicyAttachment/AppliesTo/EndpointReference/ServiceName/@Name
  This required attribute specifies the QName of the service.
/PolicyAttachment/AppliesTo/EndpointReference/Operation
  This optional, extensibility-based element specifies the operation being referenced.
/PolicyAttachment/AppliesTo/EndpointReference/Operation/@Name
  This optional, extensibility-based element specifies the QName of the operation being referenced.

Given the description of FIGS. 1A-4 and the description of the above-mentioned web service specifications as background information, the description of the remaining figures relates to the present invention. A typical enterprise's data processing system contains robust support for security-related operations, including authorization operations. A typical data processing system often uses support servers to provide authorization, authentication, and session management services as a front-end to application servers, e.g., as shown within FIG. 2, particularly for access management of computational resources, i.e. for making authorization or access control decisions with respect to computational resources.

Although FIG. 2 shows that a typical enterprise's data processing system can provide web services and WSDL documents that describe those web services, the present invention is directed to extending access control management of computational resources to include web services as defined within WSDL documents.

More specifically, one aspect of the present invention is the representation of an endpoint reference/resource address within a protected object namespace, e.g., in a manner similar to that already described above with respect to FIG. 4. An endpoint reference represents just a single resource within a WSDL document. The present invention uses the WSDL document and transforms its information into a hierarchical tree structure that represents all of the computational resources that are identified within a WSDL document. The WSDL document does not explicitly define the endpoint references; an endpoint reference provides a manner to reference into the service name and port type of a WSDL document. The present invention extends the endpoint reference to include an operation so that it could go even further. Hence, the presentation of an endpoint reference also provides a means to navigate through the hierarchical model that is generated.

WS-Addressing informs one how to have a transport-neutral means of representing an endpoint based on the WSDL definition; the endpoint reference that is defined in WS-Addressing is defined based on the concrete WSDL binding. The present invention represents the protected object namespace based on the abstract part of the WSDL description and then uses the endpoint reference to move from concrete binding to the abstract-defined protected object namespace. In so doing, the present invention is able to get many different bindings, e.g., a Java™ application versus a .Net™ application or a SOAP/HTTP application versus a SOAP/JMS application, all of which are defined with the same policy. In other words, representing the protected object namespace off the abstract part of the binding allows the present invention to apply a consistent policy to the web services even though they are implemented differently. For example, one implementation can use JAAS™ to authorize access to the Java™ resource but not the .Net™ resource at the resource itself. However, keeping the access control decision to the abstract level means that the present invention can apply a JAAS™ based authorization decision, for example, to the web services invocation without having to know more detail about how the web service itself (as described by the concrete binding) is implemented (e.g., Java™ or .Net™). In this manner, the present invention informs one how to use a similar transport-neutral and implementation-independent manner of representing an endpoint based on the WSDL definition for the purposes of access control.

In other words, the present invention leverages the WS-Addressing specification's means of identifying the endpoint reference; a service name that has been determined from a SOAP message will be explicit to the binding in question; the present invention takes this service name and de-references it (in accordance with the WSDL) into an endpoint reference that is relevant to the abstract part of the WSDL. The WS-Addressing-defined endpoint reference that is produced based on a web services request is specific to the binding; the present invention de-references that and turns it into an abstract endpoint reference that can be used as a pointer into the protected object namespace. In this manner, the present invention leverages WS-Addressing to describe how to address the endpoint reference in a manner that is consistent with the endpoint reference's WSDL description. It should be noted that "operation" is not part of WS-Addressing's abstract "wsa:EndpointReferenceType" datatype; an operation is something that an embodiment of the present invention obtains based on its ability to look into the SOAP body of a web service request, thereby making an access control decision based on service/port and then refining this further to an access control decision based on operation; hence, the present invention extends use of WS-Addressing, as illustrated in more detail hereinbelow.

The determined hierarchical information can be used to represent a protected object namespace on which authorization decisions are made. The present invention provides the ability to recognize a resource at a finer granularity based on an endpoint reference/address as represented by WS-Addressing; a second aspect of the present invention is support for authorization decisions at various levels of granularity, based on the point in the response flow at which an authorization decision is being made, how much information is available, and the desired granularity of the overall authorization or access control decision.

In other words, one aspect of the present invention is the ability to parse a WSDL description and build a hierarchical protected object namespace for authorization of access to the resource, wherein the protected object namespace is based on the abstract part of a WSDL but can be used to assist in authorization decisions for multiple different concrete bindings of this WSDL, wherein the concrete binding/request is based on the WS-Addressing endpoint reference. A second aspect of the present invention is that the same protected object namespace can be used across a request flow so that authorization decisions can be made iteratively through a request flow. This feature of the present invention allows the denial of access to unauthorized requests as close as possible to the edge or the front-end of the server-side processing, thereby providing improved performance; for example, application servers spend less time on requests that result in being unauthorized that could have been turned off earlier).

Figure 5:
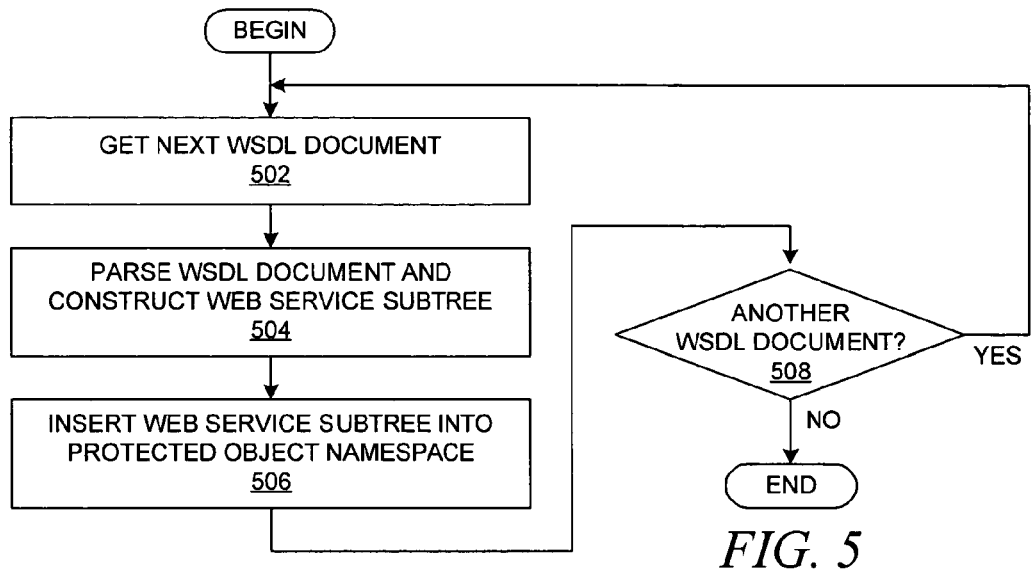
FIG. 5 depicts a flowchart that shows a process for transforming a WSDL document into a tree/subtree within a protected object namespace in accordance with an embodiment of the present invention.

With reference now to FIG. 5, a flowchart depicts a process for transforming a WSDL document into a tree/subtree within a protected object namespace in accordance with an embodiment of the present invention. The process that is shown within FIG. 5 is performed within a data processing system that supports one or more web service applications; the web service applications would be associated with one or more WSDL documents that are maintained within the data processing system to inform clients of the web service applications about the abilities of the web service applications.

The process commences by retrieving one of possibly many WSDL documents that are maintained within a data processing system that supports web service applications (step 502). The WSDL document is parsed and a web service tree/subtree is constructed (step 504). The constructed web service subtree is inserted into a protected object namespace (step 506), e.g., either so that the constructed web service tree can be accessed alone or so that the constructed web service subtree is added to another subtree or other subtrees within the protected object namespace. A determination is made as to whether there is another WSDL document that needs to be processed (step 508). If so, then the process branches back to step 502; otherwise, the process is concluded. The manner in which a WSDL document is parsed so that a web services subtree can be constructed within a protected object namespace is illustrated in more detail hereinbelow.

Figure 6:
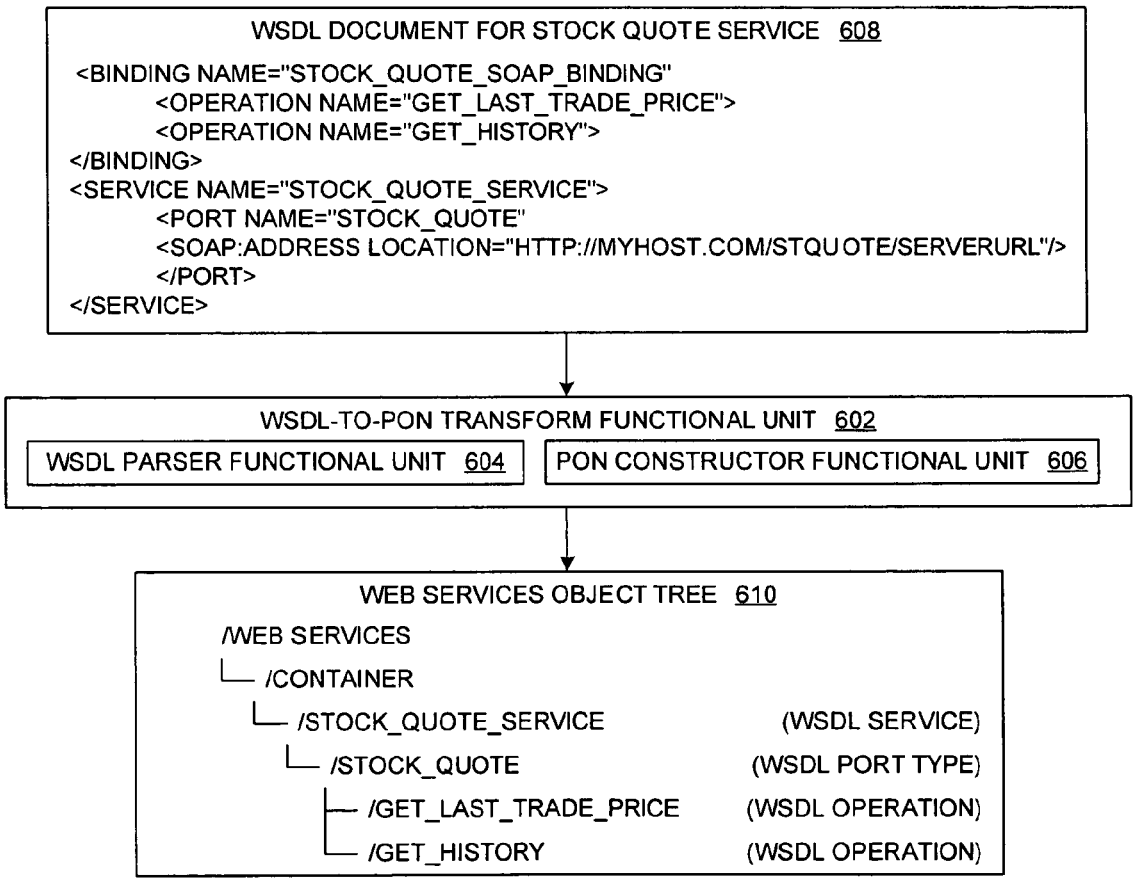
FIG. 6 depicts a block diagram that shows an example of some computational elements that may be used to transform the information in a WSDL document into a web services object tree/subtree in accordance with an embodiment of the present invention.

With reference now to FIG. 6, a block diagram depicts an example of some computational elements that may be used to transform the information in a WSDL document into a web services object tree/subtree. WSDL-to-PON transform functional unit 602 contains WSDL parser functional unit 604 that contains functionality for parsing a WSDL document. WSDL-to-PON transform functional unit 602 also contains PON (protected object namespace) constructor functional unit 606 that contains functionality for constructing a protected object namespace from the web service elements that are found within a WSDL document by WSDL parser functional unit 604. WSDL-to-PON transform functional unit 602 accepts WSDL document 608 as input and generates web services object tree 610 as output. WSDL-to-PON transform functional unit 602 may be embodied within a stand-alone administrative utility application that is used by a system administrator to configure an access control decision server to enable it to support resource access authorization decisions with respect to web services within the computational environment. In an alternative embodiment, WSDL-to-PON transform functional unit 602 may be embodied within various types of servers within the data processing system, including an access control decision server, such as access control decision server 402 that is shown in FIG. 4 and in FIG. 7. In another alternative embodiment, WSDL-to-PON transform functional unit 602 can be embedded within an application that can periodically scan through a Universal Description Discovery and Integration (UDDI) registry to ensure that all of the web services that are defined in the UDDI registry are adequately and dynamically represented in the protected object namespace.

In this manner, WSDL-to-PON transform functional unit 602 performs the process that is illustrated within FIG. 5, possibly along with other processes that are related to incorporating support for web services into an access control decision, i.e. resource access authorization, framework within a data processing system. More specifically, the abstract part of a WSDL document is parsed and a web service object tree, i.e. a web-services-specific object subtree for a protected object namespace tree, such as web service object tree 704, is generated. Each service in the WSDL document is a root in a web service object tree; it should be noted that there is usually only one service per WSDL document. Each service has a subtree containing one or more PortType. Each PortType has a subtree containing one or more Operations. Each Operation may have a two-noded subtree, with input and output message. The web-services-specific object subtree is then inserted into a (possibly pre-existing) protected object namespace tree; the web services object tree can be inserted as a complete, stand-alone tree within a web services object space, or it can be inserted as a complete, stand-alone tree within a container of related services, e.g., such as the search container shown in FIG. 6, e.g., different web site search engines in a single container. Simple web services may expose one or two operations within a single port type, and the web service itself may be represented by a single port type. More complex web services descriptions may include multiple services or port types within a given address. In addition, seemingly independent WSDLs may describe different services available within a single address. This level of overlap can be used to add subtrees to a protected object namespace as part of the namespace population. It should be noted that the web-services-specific object subtree does not specify how the actual endpoints are implemented, e.g., Java™, .Net™, CICS, etc., nor accessed, e.g., SOAP/HTTP, SOAP/JMS, RMI/IIOP, etc.

Figure 7:
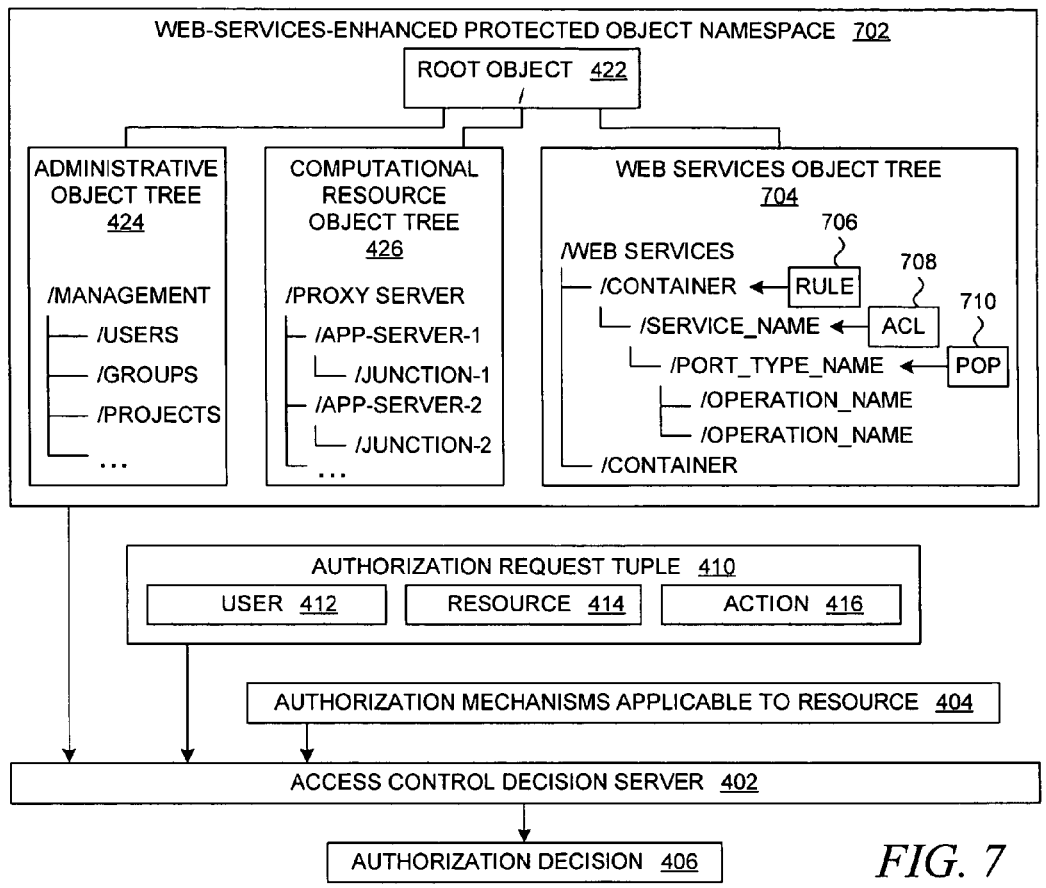
FIG. 7 depicts a block diagram that shows a set of inputs and outputs to an access control decision server during an authorization decision, wherein the inputs have been enhanced to provide support for web services in accordance with an embodiment of the present invention.

With reference now to FIG. 7, a block diagram depicts a set of inputs and outputs to an access control decision server during an authorization decision, wherein the inputs have been enhanced to provide support for web services in accordance with an embodiment of the present invention. FIG. 7 is similar to FIG. 4; identical reference numerals refer to identical elements within the figures. In the exemplary embodiment that is shown in FIG. 7, access control decision server 402 may not have been modified to include additional functionality as compared to access control decision server 402 in FIG. 4 because access control decision server 402 is able to accept enhanced protected object namespace 702 that has been modified to include web service object tree 704, i.e. a web-services-specific subtree within a protected object namespace; web service object tree 704 may be output from a WSDL-to-PON transform functional unit that has produced a web services object tree in a manner similar to that discussed above with respect to FIG. 5 or FIG. 6. In other words, web service object tree 704 is maintained in a manner similar to administrative object tree 424 or computational resource object tree 426, e.g., within a similar data structure or within the same data structure. In this manner, although the inputs have been enhanced, the present invention is able to provide support for access control decisions within a data processing system using many components of a pre-existing access control decision infrastructure to produce authorization decision 406.

In the example that is shown in FIG. 7, various types of authorization mechanisms have been attached to nodes within the web-services-specific subtree within the protected object namespace. Any authorization mechanisms that are appropriate for a given node are logically associated with the node within the subtree. For example, authorization rule 706 is associated with a container, while access control list (ACL) 708 is associated with a particular web service; protected object policy (POP) 710, a particular type of policy, is associated with a particular port within the web service.

Figure 8:
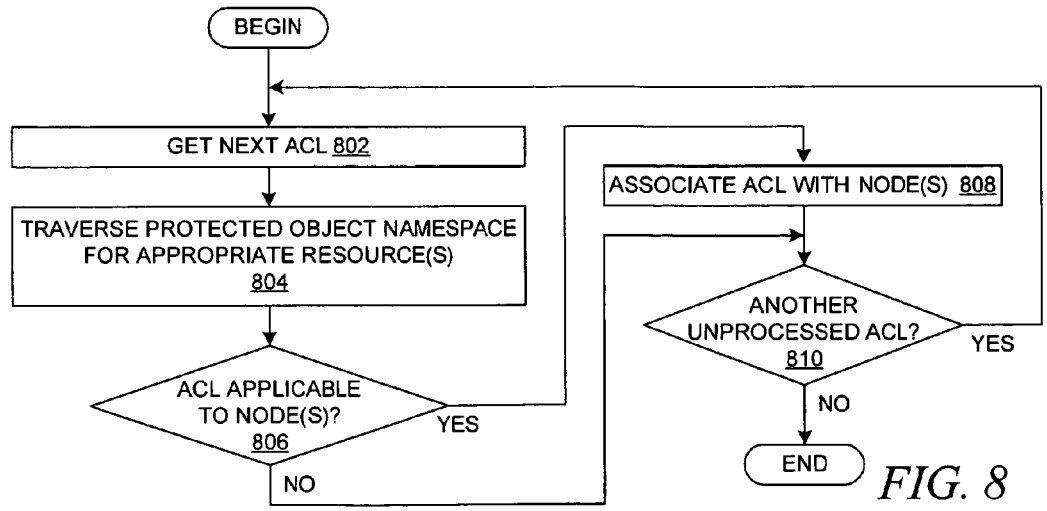
FIG. 8 depicts a block diagram that shows a process that may be used to attach policy objects to web service objects within a protected object namespace in accordance with an embodiment of the present invention.

With reference now to FIG. 8, a block diagram depicts a process that may be used to attach policy objects to web service objects within a protected object namespace in accordance with an embodiment of the present invention. The process commences when an ACL object is retrieved from an ACL database or some type of authorization policy database (step 802); the ACL data object may be formatted as any type of appropriate data object. The ACL object is examined for an identifier of a resource or a set or group of resources, such as a URI, and the protected object namespace is traversed for appropriate resources (step 804). In this manner, an ACL is compared against each node in the protected object namespace so that a determination can be made as to whether or not the node represents a resource against which the ACL is applicable (step 806) (although efficiencies may be gained by terminating the search of a subtree at a branch node if it indicates otherwise).

If the ACL is applicable to a node or nodes, then the ACL is attached to the node or nodes (step 808). After performing the association operation or operations, or if the ACL was not applicable to any nodes, then a determination is made as to whether or not there is another unprocessed ACL (step 810); if so, the process branches back to step 802, and if not, the process is concluded.

As noted above, FIG. 7 illustrates various types of authorization mechanisms that have been attached, i.e. logically associated, with objects within a protected object namespace. For example, a pointer or other type of data reference to an authorization object could be placed into a node within a data structure that holds the protected object namespace. In this manner, for ease and efficiency of computation, various authorization objects, such as ACLs, are attached to within a data structure that holds the protected object namespace in a pre-processing manner so that the ACLs and the protected object namespace do not need to be searched and/or compared for each web services request at the time that a given web services request is processed. Although the present invention is able to support a variety of authorization decision mechanisms, FIG. 8 only illustrates the process with respect to ACLs.

An access control policy can be defined at any node on the web-services-specific object subtree that is generated by the process in FIG. 5. An ACL that has been applied or attached to a container provides access control functionality for any entity that wants to access any of a set of related web services, e.g., search services. An ACL that has been applied or attached to a service provides access control to services within a container, e.g., higher level customers get access to a premium search engine while lower level customers get access to a less capable search engine.

An ACL that has been applied or attached to a PortType provides access control to a "port" that is exposed by the WSDL document, e.g., in this context, a network port, such as port number 8080, with each resource defined by a WSDL being bound to a single port. In general, most WSDLs define one port per service but allows for a multiple-port-per-service definition. An ACL that has been applied or attached to an operation provides access control to functionality within service, e.g., customers with current profiles get access to a special function within the search service. An ACL may be applied or attached to a level of message, but decisions on at the message level would be more likely to be relevant to quality-of-service decisions than to security-related decisions; it should be noted that the present invention is applicable not only to security-related access control decisions but also other types of access control decisions, such as quality of service.

Referring again to FIG. 7, in an exemplary transaction in which access control decision server 402 is performing an access control decision operation with respect to a web services request, access control decision server 402 considers authorization request tuple 410, which represents the web services request as received in an incoming message. Resource 414 may represent an endpoint reference, wherein a URI from an HTTP header indicates a particular service and PortType and an operation is determined by examination of the SOAP body, e.g., a method invocation on a Java™ class. In other words, when a web services request is received, it is parsed to generate a WS-Addressing endpoint reference from the information within the incoming web services request, which is then used as input into the access control decision. The generated endpoint reference is used as a reference or pointer into the protected object namespace. The access control decision operation occurs by taking the generated endpoint reference and other inputs and evaluating the ACL or other authorization mechanism that was attached to the protected object namespace.

Figure 9:
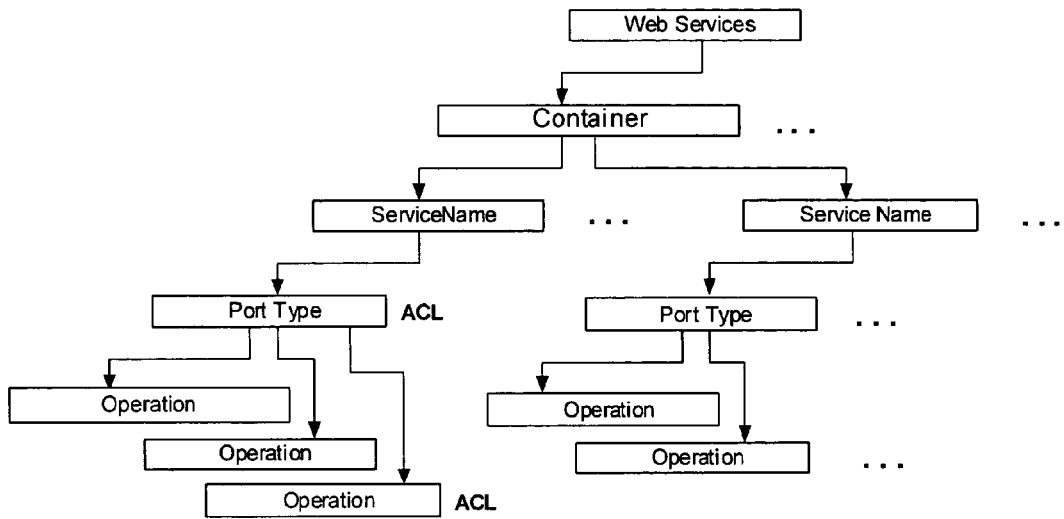

With reference now, FIGS. 9-12 depict a more detailed example of the manner in which the present invention builds a protected object namespace based on a WSDL that describes the addressing of a resource. FIG. 9 illustrates a generic object namespace that has been built from a WSDL. A single object namespace may be used to represent access control decisions made at various points in the request flow. For example, an access control decision can be made at the edge of the request flow that is very coarse, e.g., access to a given web service address, or fine, e.g., access to a particular Port Type, where not all Port Types are allowed to all requesters.

Figure 11:
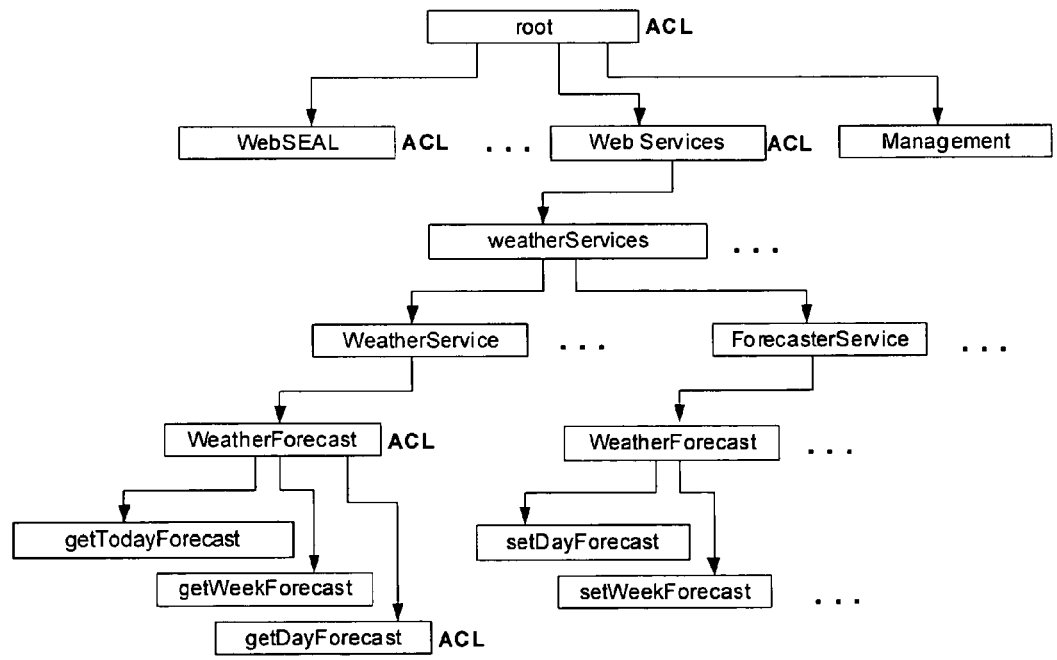

For example, the portion of a WSDL description as shown in FIG. 10 can be used to build a protect object namespace. The protected object namespace that is built from the WSDL description in FIG. 10 is shown in FIG. 11. The tree structure is built so that all operations within a <wsdl:portType> are included under that port type in the protected object namespace; all port types included under <wsdl:serviceName> are included under that service name within the object namespace. The root of the protected object namespace is simply a placeholder, "Web Services", which allows this protected object namespace to be added to the root of an existing protected object namespace, as shown in FIG. 7, without interfering with the structure of the pre-existing protected object namespace.

Figure 12:
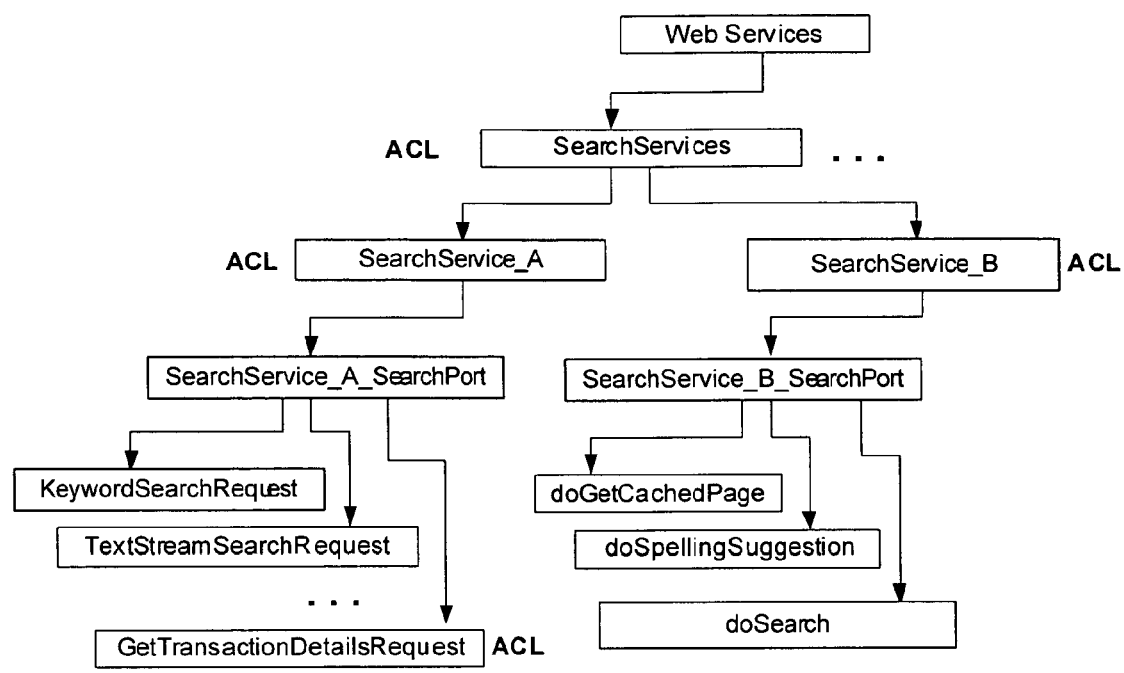

Within the "Web Services" placeholder container is another placeholder, the notion of a container. The container, which is nameable, is used to allow the grouping of related services, such as those defined within a single WSDL or those from different WSDLs. For example, different web sites can have WSDLs for different search services, each of which define a single service, wherein these single services can be logically grouped into a single container for search services, as shown in FIG. 12. Individual ports within a WSDL description are represented as nodes in the protected object namespace tree; each of these ports has as leaf nodes the operations defined for each port. In a Java™-enabled environment, these operations are the equivalent of methods on a Java™ class (the port). This representation of a WSDL description in a hierarchical, tree-structured, protected object namespace is completely independent of the binding of the web service. This allows a web service to be supported as a protected resource/resources in the same manner regardless of the binding/transport method that is used to transmit web services requests, thereby allowing for the consistent application of authorization policy through ACLs or other mechanisms that are applied to these implementation-independent WSDL "nodes".

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. A method for performing access control decisions, comprising:

specifying a protected object namespace based on a Web Service Description Language (WSDL) document such that a Web Services Addressing-defined endpoint reference provides a reference into the protected object namespace, wherein the protected object namespace is based on an abstract part of the WSDL document, the WSDL document also including a concrete part that is based on the Web Services Addressing-defined endpoint reference;

de-referencing the Web Services Addressing-defined endpoint reference into a pointer into the protected object namespace; and using a computing device having a hardware processor to perform an access control decision with respect to a resource using one of a set of authorization mechanisms represented by the pointer into the protected object namespace.

2. The method as described in claim 1 wherein the specifying step generates a tree or a sub-tree within the protected object namespace.

3. The method as described in claim 1 further including associating an access control policy with a node in the protected object namespace.

4. The method as described in claim 1 wherein the authorization mechanisms are associated with disparate web services.

5. The method as described in claim 1 wherein the Web Services Addressing-defined endpoint reference is derived from a web services request.

6. The method as described in claim 1 wherein the protected object namespace is a hierarchical data structure.

7. A data processing system, comprising:

a processor;

a memory; and program code stored in the memory and executed by the processor for parsing a Web Services Description Language (WSDL) document into a protected object namespace, wherein the protected object namespace is based on an abstract part of the WSDL document, the WSDL document also including a concrete part that is based on a Web Services Addressing-defined endpoint reference, the program code comprising:

a first functional unit that parses the WSDL document;

a second functional unit that constructs the protected object namespace from one or more web service elements that are located in the WSDL document by the first functional unit; and a third functional unit that de-references the Web Services Addressing-defined endpoint reference into a pointer into the protected object namespace; and program code stored in the memory and executed by the processor for performing an access control decision with respect to a resource using at least one authorization mechanism represented by the pointer into the protected object namespace.

8. The data processing system as described in claim 7 wherein the protected object namespace is stored in memory in the data processing system.

9. The data processing system as described in claim 7 further including program code stored in the memory and executed by the processor for associating an access control policy with a node in the protected object namespace.

10. A non-transitory computer readable medium comprising a set of computer program instructions that, when executed by a processor, perform the following machine-implemented method steps:

specifying a protected object namespace based on a Web Service Description Language (WSDL) document such that a Web Services Addressing-defined endpoint reference provides a reference into the protected object namespace, wherein the protected object namespace is based on an abstract part of the WSDL document, the WSDL document also including a concrete part that is based on the Web Services Addressing-defined endpoint reference;

de-referencing the Web Services Addressing-defined endpoint reference into a pointer into the protected object namespace; and performing an access control decision with respect to a resource using one of a set of authorization mechanisms represented by the pointer into the protected object namespace.

11. The computer readable medium as described in claim 10 wherein the method further includes associating an access control policy with a node in the protected object namespace.

12. The computer readable medium as described in claim 10 wherein the authorization mechanisms are associated with disparate web services.

13. The computer readable medium as described in claim 10 wherein the Web Services Addressing-defined endpoint reference is derived from a web services request.

14. The method as described in claim 1 wherein the abstract part of the WSDL document is used for authorization decisions for multiple, distinct bindings of the WSDL document associated with the disparate web services.

15. The apparatus as described in claim 7 wherein the abstract part of the WSDL document is used for authorization decisions for multiple, distinct bindings of the WSDL document associated with the disparate web services.

16. The computer readable medium as described in claim 10 wherein the abstract part of the WSDL document is used for authorization decisions for multiple, distinct bindings of the WSDL document associated with the disparate web services.

* * * * *